April 7, 1931. R. S. KIRK 1,800,182
GUM STRIP REMOVING DEVICE
Original Filed Sept. 16, 1926 5 Sheets-Sheet 1

Inventor
Raphael S. Kirk,
By
Attorney

April 7, 1931.   R. S. KIRK   1,800,182
GUM STRIP REMOVING DEVICE
Original Filed Sept. 16, 1926   5 Sheets-Sheet 2
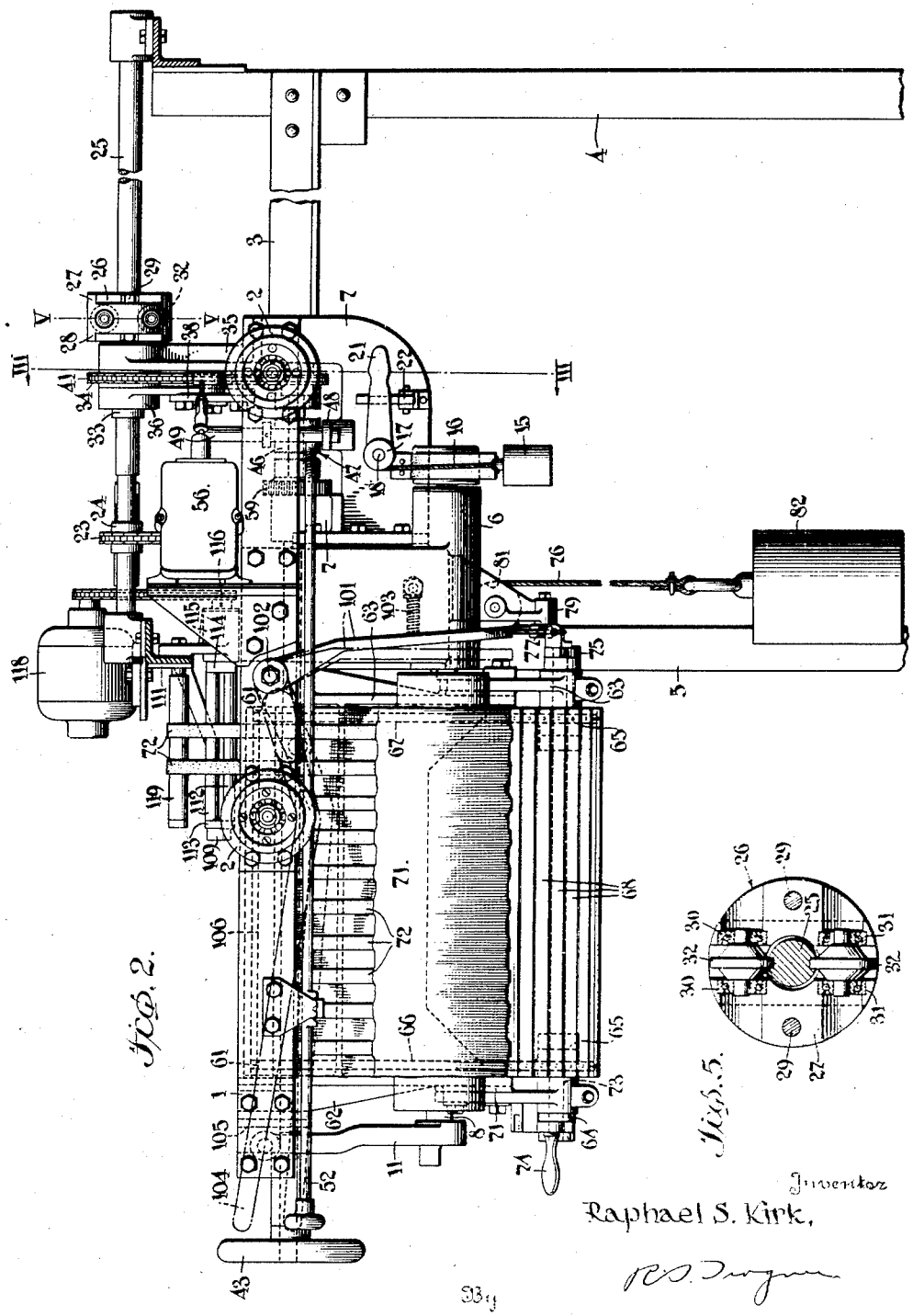
Inventor
Raphael S. Kirk,
Attorney April 7, 1931.   R. S. KIRK   1,800,182
GUM STRIP REMOVING DEVICE
Original Filed Sept. 16, 1926   5 Sheets-Sheet 3
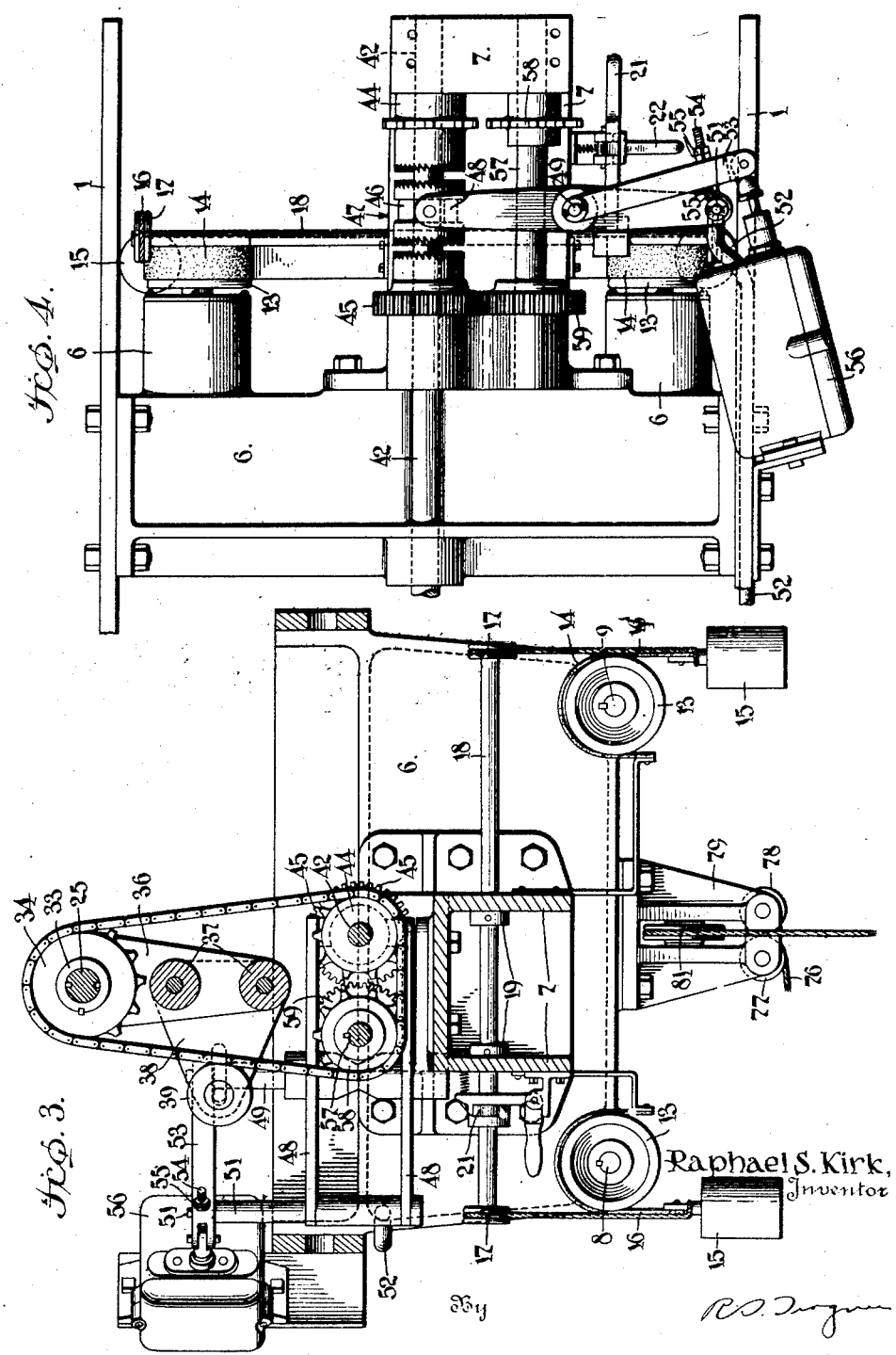
Raphael S. Kirk, Inventor

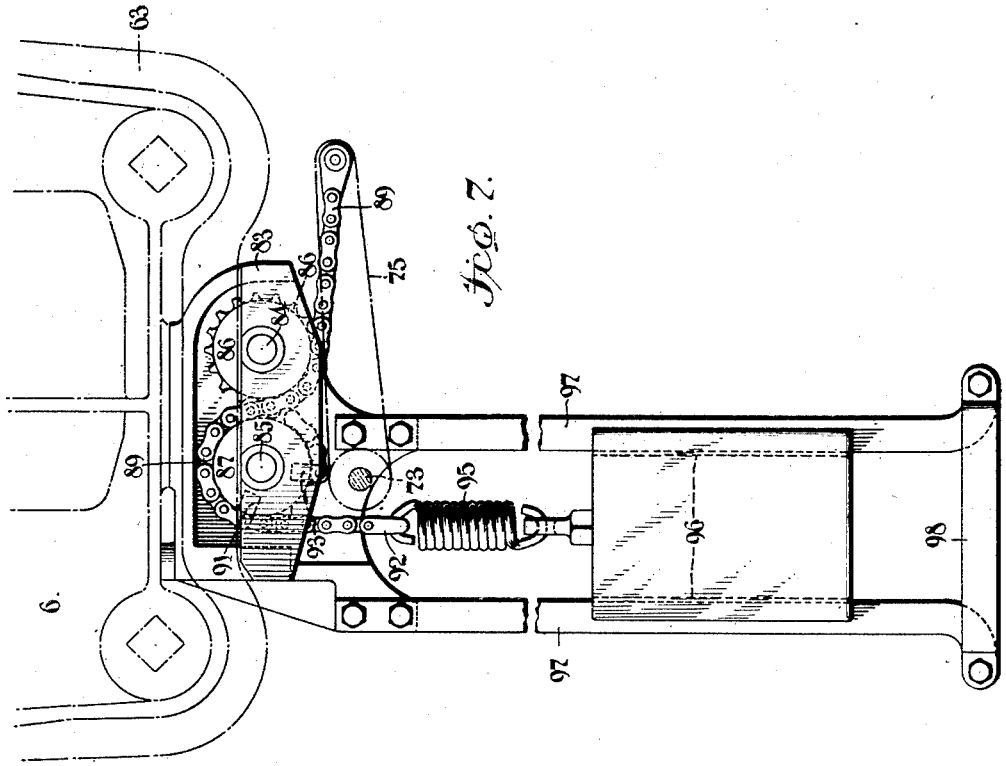
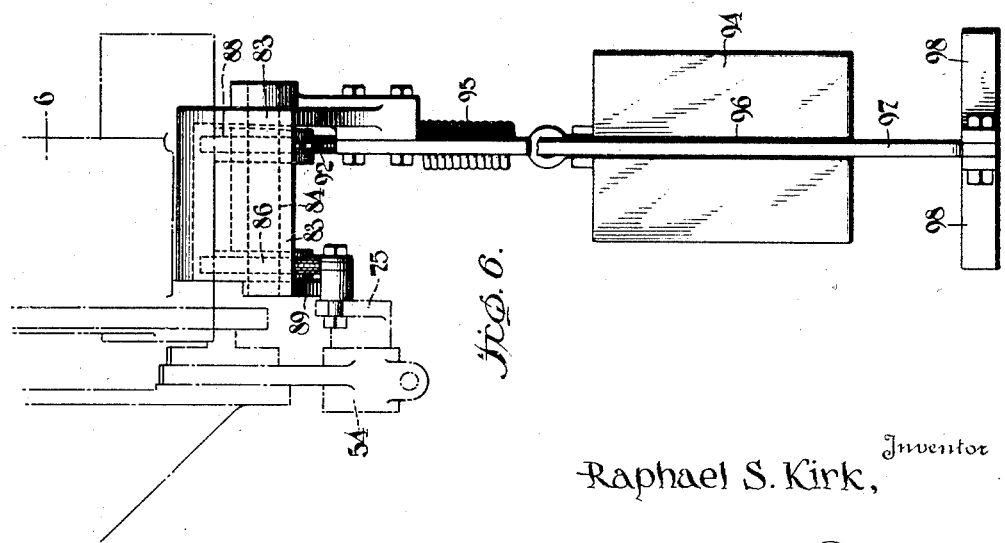

April 7, 1931. R. S. KIRK 1,800,182
GUM STRIP REMOVING DEVICE
Original Filed Sept. 16, 1926 5 Sheets-Sheet 5
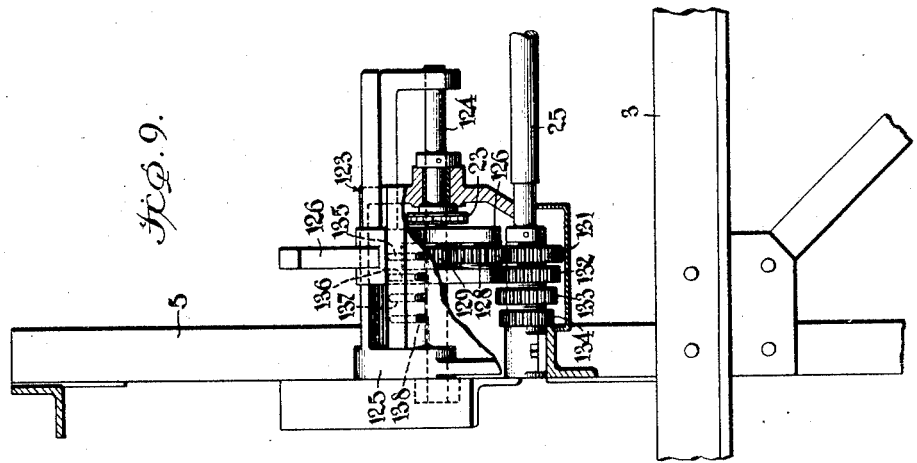
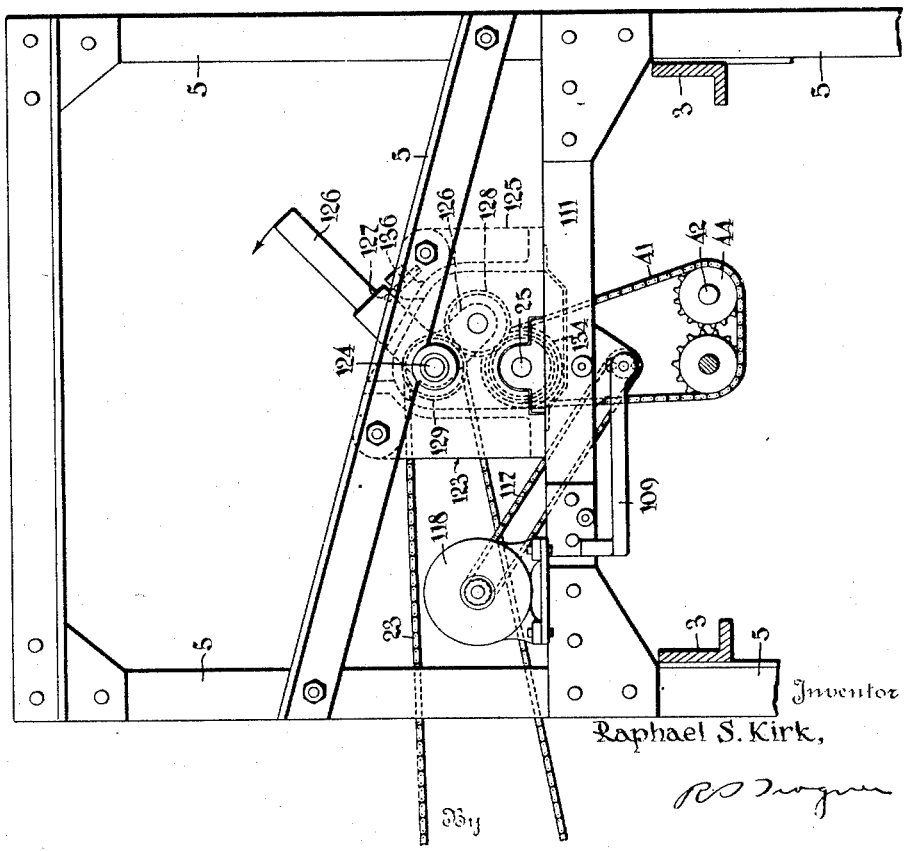
Inventor
Raphael S. Kirk,
Attorney Patented Apr. 7, 1931

1,800,182

UNITED STATES PATENT OFFICE

RAPHAEL S. KIRK, OF AKRON, OHIO, ASSIGNOR TO THE GOODYEAR TIRE & RUBBER COMPANY, OF AKRON, OHIO, A CORPORATION OF OHIO

GUM-STRIP-REMOVING DEVICE

Original application filed September 16, 1926, Serial No. 135,850. Divided and this application filed November 16, 1927. Serial No. 233,619.

My invention relates to a method and apparatus for manipulating rubber strips and rubberized fabric bands, and it has particular relation to a method of and machine for removing plastic strips from lined rolls thereof.

This application is a division of my copending application 135,850, chafing strip building machine, filed Sept. 16, 1926.

One object of my invention is to provide a novel method for removing strips of unvulcanized rubber tissue from lined rolls thereof.

Another object of my invention is to provide a method of unwinding and removing gum strips from lined rolls thereof wherein the strips are subjected to a beating action adjacent their points of attachment to the roll.

A further object of my invention is to provide a mechanical structure for removing gum strips from lined rolls thereof in accordance with my novel method.

In order to protect the bead portion of a pneumatic tire from the wearing action of the rim upon which it is mounted, as well as to insure the safe anchorage of the bead in the plies of tire fabric, it is common practice to incorporate this portion of the tire within what is known as a chafing strip. The strip consists of several superimposed bands of rubberized fabric and often includes one or more strips of unvulcanized rubber tissue. The length of the strip is dependent upon the size of the tire; whereas the number of layers of fabric, as well as of rubber tissue, depends largely upon the character and quality of the tire in which the product is to be incorporated.

It is customary to wind a plurality of strips of unvulcanized rubber tissue adhering to a liner strip into rolls from which the strips are removed as used.

In the above mentioned application, I have described and claimed a machine involving continuously operated means for supplying a plurality of uninterrupted bands of fabric to a device for measuring and cutting the fabric into proper lengths. The machine therein disclosed also comprises means for feeding one or more gum strips into juxtaposition to the bands of fabric to be stitched thereto to form the fabricated product. This application deals particularly with the mechanism for removing the plastic strips from their liner roll to be utilized, for example, in a chafing strip building machine.

A better understanding of my invention may be had by reference to the drawings, in which:

Fig. 2 is a side elevational view, parts being broken away, of the structure illustrated in Fig. 1;

Fig. 3 is a cross-sectional view, taken substantially along the line III—III of Fig. 2;

Fig. 4 is a plan view on a larger scale, of the reversing mechanism which operates the rewinding device of the gum strip supplying unit;

Fig. 5 is a cross-sectional view of the slidable collar taken substantially along the line V—V of Fig. 2;

Fig. 6 is a fragmentary side elevational view of a portion of the gum strip supplying device, illustrating an alternative form of eccentric and weight mechanism;

Fig. 7 is a front view of the structure illustrated in Fig. 6;

Fig. 8 is a front elevational view, partially in cross-section, of a transmission mechanism for varying the relative rates of speed of the gum strip supplying device and the band measuring device with which it is adapted to be utilized; and Fig. 9 is a side elevational view, parts being broken away, of the device illustrated in Fig. 8.

Figure 1:
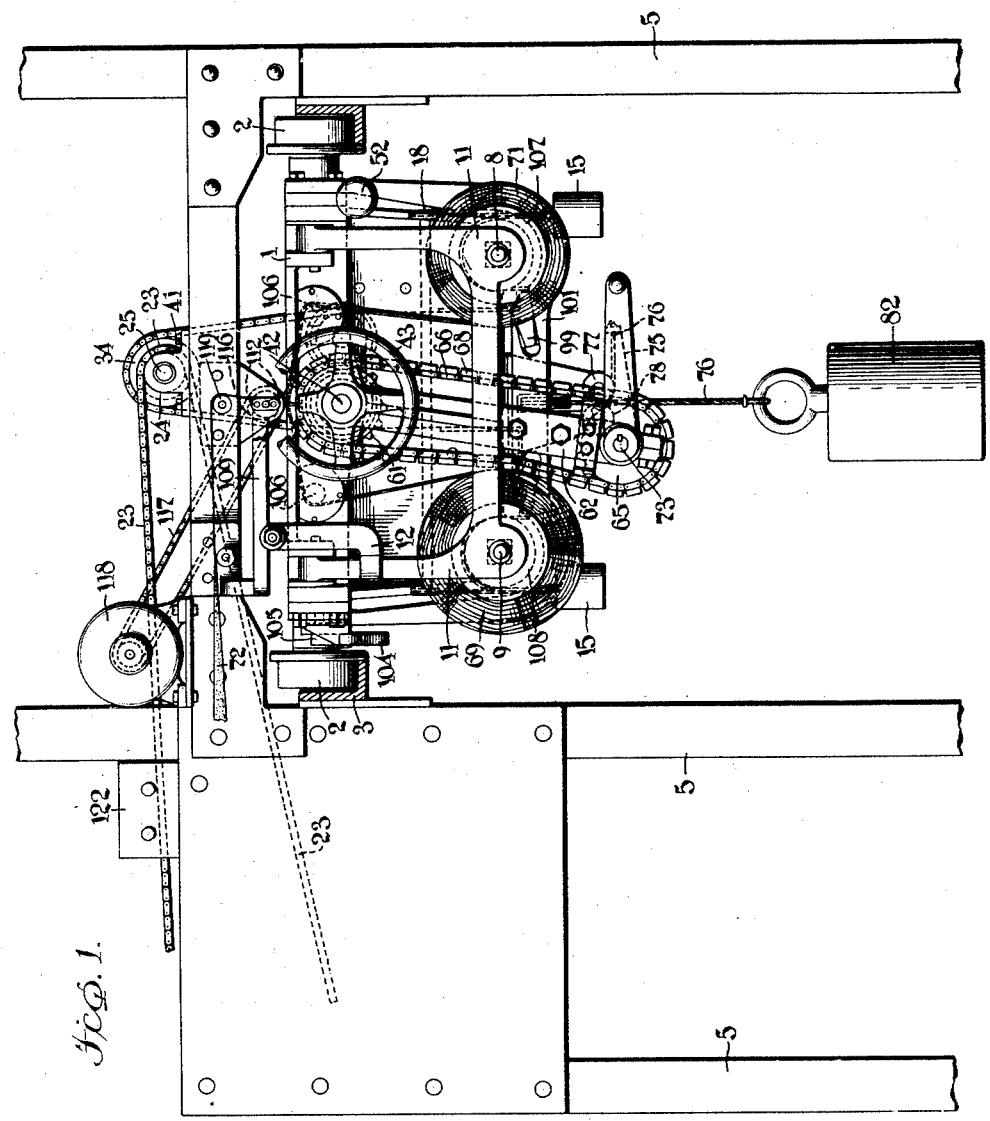
Fig. 1 is a front elevational view of a gum strip supplying device, embodying the features of my invention.

The particular embodiment of my invention illustrated in the accompanying drawings, consists of a rectangular frame portion 1 that is supported by four ball bearing wheels 2, which are adapted to travel in rolling contact along two horizontal angle iron tracks 3. The angle members are supported by vertical members 4 and by a trellis structure 5. A rear journal casting 6 (Fig. 3), forming a part of the frame 1, extends below the tracks 3. The frame 1 also includes a bracket 7 rigidly secured to the journal casting 6. Two horizontal shafts 8 and 9 are rotatably mounted in relatively long bearing sockets provided in the journal casting, the portions of the shafts extending therefrom being rectangular in cross-section. The front ends of the shafts are loosely disposed in a U-shaped member 11 which is pivoted to the rectangular frame 1. An L-shaped latch 12 is swingably mounted on the frame and normally assumes a vertical position when it maintains the U-shaped member 11 in engagement with the ends of the shafts 8 and 9. The rear ends of the shafts 8 and 9 project a short distance beyond the journal casting 6 and are provided with brake pulleys 13, secured thereto.

A leather band 14, one end of which is secured to the bracket 7, passes about each pulley 13. The other end of the band has a weight 15 suspended therefrom. In addition to the leather band, each weight is supported by a cord 16, which is trained over a small wheel 17, directly above the weight. A shaft 18 is rotatably supported in the bracket 7 and is provided with two collars 19 that are secured thereto in order to obviate lateral play of the shaft. The shaft 18 supports the wheels 17 which are keyed to its ends, together with a small hand lever 21. The lever is adapted to engage an L-shaped latch 22 that is fulcrumed upon the bracket 7. In order to lower the weights 15 and thereby cause the brake band 14 to engage the pulley 13, the latch 22 is swung in a clockwise direction, as viewed in Fig. 3, whereby it will escape engagement with the lever 21.

Power is preferably supplied to the gum strip removing device through a chain 23 driven from a suitable source of power (not shown). The chain 23 drives a sprocket 24 which is keyed to a splined shaft 25 that is journaled at each end in the angle iron frame structure 4. A collar 26 is mounted on this shaft which consists of two sections 27 and 28, that are held together by pins 29 (Figs. 2 and 5). The sections are machined to accommodate, when united, two sets of ball bearings 30 and 31, rotatably supporting a set of rollers 32, whose peripheries mesh with the splined portion of the shaft 25. By this construction axial movement of the collar along the shaft 25 is facilitated while the collar is driven by the shaft.

A sleeve 33 is loosely mounted on the shaft 25, and is made unitary with the driven collar 26. A sprocket 34 is keyed to this sleeve. On one side of the sprocket 34 the shaft 25 is enclosed by a journal bracket 35 which constitutes an upper integral portion of the bracket 7. On the other side of the sprocket 34, an arm 36 is loosely disposed about the shaft 25, and is joined securely to the bracket 35 by pins 37. A slotted plate 38 rigidly secured to the arm 36 adjustably supports a slack take-up idler roller 39 that engages a chain 41 trained about the sprocket 34.

A main shaft 42 of the device is rotatably supported at its extreme rear end by the bracket 7. The shaft 42 also extends across the frame casting 6 and is rotatably journaled therein. A hand wheel 43 is rigidly secured to the front end of the shaft 42. Also, a sprocket 44 and a gear 45 are rotatably mounted thereon adjacent the rear end thereof. Adjacent hub portions of the sprocket and gear have serrated edges which are adapted to be engaged by cooperating serrated portions of an annularly recessed collar 46 which is slidably keyed to the shaft 42. The members 44, 45 and 46 constitute a clutch mechanism generally designated by the numeral 47. The collar 46 is actuated laterally by two arms 48, which engage the recessed portion on opposite sides thereof. These members are fulcrumed about a vertically disposed stud shaft 49 which is secured in the bracket 7. The opposite ends of the links 48 are interconnected by a pin 51 to which a rod 52 is secured that extends to the front of the machine (Fig. 2). An additional link 53 is pivoted about the stud shaft 49 and adjustably mounted upon a pin 54, the latter being pivoted to the pin 51. Nuts 55 are positioned on opposite ends of the link 53 to secure the same in any desirable adjusted position. The extreme end of the link 53 is joined to an electrical circuit reversing device 56, whose function will be described later.

A relatively short shaft 57, disposed adjacent and parallel to the rear portion of the main shaft 42, is journalled at both ends in the bracket 7 that is bolted to the member 6. A sprocket 58 having the same number of teeth as sprocket 44, is keyed to the shaft 57 and is driven by the chain 41. Also a gear 59, keyed to the shaft 57, meshes with the gear 45, these two gears being exactly the same size. From this construction it will be observed that the sprockets 44 and 58 are always rotated in the same direction by the chain 41. When the collar 46 engages the sprocket 44, the shaft 42 will be rotated in the same direction as the sprocket itself. When, however, the collar 46 is shifted by sliding the rod 52 so as to actuate the link 48, the collar engages the serrated portion of the gear 45 and rotative motion is transmitted from the shaft 57 through the gear 59 to rotate the shaft 42 in the direction opposite that just described.

Two sprockets 61 mounted in spaced relation are rigidly secured to the shaft 42. Also, two arms 62 and 63 are pivotally suspended from this shaft. Adjacent the lower ends of the arms, bearings are provided which rigidly support the ends of a tubular shaft 64. Two sprockets 65 are freely rotated about the tube 64 and are driven by chains 66 and 67 trained about the respective sprockets 61.

The corresponding links of these chains have secured thereto individual transversely disposed bar or slat members 68 having knurled outer surfaces. This construction constitutes a so-called caterpillar, which serves as a rewinding mechanism for fabric liner rolls 69 and 71 having gum strips 72 wound therein, the manipulation of which will hereinafter be described.

The tubular shaft 64 serves as a bearing for a rod 73 which is provided with a handle 74 keyed to one end thereof and a lever 75 rigidly secured to the other end thereof. One end of the lever 75 is provided with a cable 76 which passes between two grooved pulleys 77 and 78 which are rotatably mounted upon a bracket 79 secured to the lower portion of the member 6. From these pulleys the cable is trained over a pulley 81, which is mounted upon the bracket 79 similarly to pulleys 77 and 78. A weight 82 is suspended from the free end of the cable. By reason of the force of this weight and the position of the lever 75, the caterpiller is maintained at an angle to the vertical.

When it is desired to pivot the caterpiller away from either one or the other of the liner rolls 69 or 71, the operator imparts a quick downward movement to the lever 75 by means of the handle 74. As illustrated by the position of the mechanism as shown in Fig. 1, the end portion of the cable 76 attached to the lever 75 is disposed in a horizontal position and the cable therefore exerts a force on the caterpillar tending to swing it in a clockwise direction about the shaft 42. Because the lever 75 is eccentric with respect to the adjacent portions of pulleys 77 and 78, between which the cable must pass, the weight 82 is necessarily raised somewhat by the downward movement of the lever. Continued pivotal movement of the lever beyond the vertical position will change the direction of the horizontal component force exerted on the cable 76 by the weight 82 and will thereby swing the pivoted caterpillar in an anti-clockwise direction, and the weight will simultaneously be lowered.

Another form of the eccentric mechanism is illustrated in Figs. 6 and 7. It differs from the other embodiment in that an auxiliary journal member 83 is provided, which is rigidly secured to the casting 6 and which journals the parallel shafts 84 and 85. A sprocket 86 is keyed to the shaft 84, and is aligned with a similar sprocket 87 that is keyed to the other shaft 85. In addition, a third sprocket 88 is provided which is keyed to the shaft 85.

One end of a chain 89 is secured to the end of the eccentric arm 75, and is trained between the aligned sprockets 86 and 87; the other end of the chain 89 is rigidly secured to the sprocket 87 at 91. A second chain 92 is provided which is trained over the sprocket 88; one of its ends being secured to the sprocket at 93, whereas the other end suspends a weight 94 which is connected thereto by means of a coil spring 95. The weight has two parallel grooves 96 machined therein to receive two suspended vertical guide members 97 which are bolted to the auxiliary journal 83. These guides are maintained in spaced relation by means of two cross links 98 which are rigidly secured thereto.

The operation of this embodiment is not unlike that described above. The arm 75 is disposed in eccentric relation with respect to the aligned sprockets 86 and 87; thus the weight 94 is raised and lowered each time the arm is pivoted, for the purpose of shifting the caterpillar into engagement with one or the other of the rolls of fabric 69—71.

The arc through which the caterpillar may be pivoted is limited by protruding lug portions 99 which are integral with a U-shaped member 101 that is pivoted upon the rectangular frame 1, as indicated at 102 (Fig. 2). The lugs engage the rear arm member 63. In order to cushion the swinging movement of the U-shaped member 101 in a clockwise direction, as viewed in Fig. 2, a coil spring 103 is provided, one end of which engages the U-shaped member and the other end of which is secured to the casting 6. During the normal operation of the device, it is not necessary that the pivotal movement of the caterpillar be restricted by the lugs 101, therefore, the U-shaped member bearing the lugs may be swung out of engagement with the arm 63 by lowering a lever 104, that is secured thereto at its fulcrum point 102. A triangular latch 105, which is secured to the rectangular frame member 1, maintains the lever 104 in a lowered position. The lever is sufficiently resilient to be sprung horizontally out of contact with the triangular member when it is desired that the lugs 99 be rendered operative.

Two elongate idler rollers 106, which are parallel to the drive shaft 42, are disposed within the rectangular frame member 1. The portion of the roll 71 containing the strips of gum 72 is trained and is guided by the rollers 106. The liner is wound about shells 107 and 108 which are provided with rectangular sockets adapted to be removably positioned upon the rectangular portions of the shafts 8 and 9, respectively. Preparatory to operation of the machine, one full roll including the shell is slipped on one of the shafts 8 or 9, whereas an empty shell is mounted upon the other shaft. The liner is conducted over two idler rollers 106, as well as over the top of the caterpillar, and is wound upon the empty shell or spool in a manner as illustrated in Fig. 1.

In removing the strips of rubber 72 the liner is alternately wound about one spool and rewound about the other until the supply of strips is exhausted. It will be observed that the caterpillar engages the roll, which is being wound, thereby leaving the other roll free to unwind, with only the weighted brake band 14 to resist its rotary movement.

Immediately above the caterpillar an L-shaped bracket 109 is secured to an angle iron 111, forming a part of the trellis frame 5. Two cylindrical members 112 are both rotatably mounted between two spaced members 113 and 114. One of these members 113 is journalled in a housing 115, that is secured to the angle iron 111. A sprocket 116 is keyed to one end of the member 114 and is provided with a chain 117 which is driven by a motor 118. The motor is mounted upon the stationary angle member 111. When energized, the motor causes the roller members 112 to revolve rapidly about the axis of the sprocket 116. The rollers engage the strips 72 and impart a beating action thereto adjacent the points where they are separated from the liner, before it is conducted over a roller 119, which is rotatably mounted upon the frame member 111. The beating action that is imparted to the strips by the revolving rollers 112 serves to peel the plastic rubber material away from the liner without injuriously distorting the plastic strip. The separated strips are then conducted from the machine to the point at which they are to be used.

It will be observed that with the exception of the small motor 118 and the rotatable rollers 112, together with the splined shaft 25, the entire gum strip removing device is movably mounted on the rectangular frame 1, which is supported by the four wheels 2. From this construction, it is apparent that the gum strips 72 of the stock roll are adapted to be alinged with respect to the revolvable roller members 112 and at the same time to maintain the disengaged product in aligned relation with respect to the several bracket rollers 119. It will also be observed that when the stock roll has been unwound to the end of a gum strip, the operation of the machine is temporarily suspended, during which suspension the end of the next strip is joined to the end of the one preceding. The caterpillar is then pivotally swung into engagement with the unwound roll by thrusting the handle 74 downwardly in a manner already described. By actuating the rod 52, which operates the clutch mechanism 47, the collar 46 is moved in the proper direction to reverse the direction of travel of the caterpillar about the sprockets 61 and 65. Simultaneously with this adjustment the electric circuit reversing mechanism 56, which engages the link 53, is actuated to reverse the flow of current through the small motor 118. This operates to change the direction of rotation of the motor drive shaft and hence the direction of rotation of the rollers 112. When the liner is being wound about shell 108 the sprocket 116 driving the roller members 112 is rotated in a counter-clockwise direction, as viewed in Fig. 1. The gum strips 72 pass on the right hand side of the revolving rollers 112 and are conducted directly to the idler roller 119. The reverse is true when the liner is being wound about the other shell 107, that is, the rollers 112 are revolved in a clockwise direction and the strips 72 pass to the left hand side of the rollers 112 as they are conducted to the idler roller 119.

When the supply of gum strips on the lined stock roll is exhausted, the liner will have been wound almost completely about one of the single shells 107 or 108, after which the lug member 99 is brought into operative relation with the rear arm 63 by pivoting the lever 104 upwardly. The latch 12 is subsequently swung out of engagement with the U-shaped member 11, which is pivoted outwardly through an angle of 180°. This enables the operator to slide the shell, together with the wound liner from the rectangular portion of one of the shafts 8 or 9, according to which one the liner has been wound upon. A new roll is then inserted before the U-shaped member is swung into engagement with the ends of the shafts 8 and 9. The end of the liner of the new roll is conducted about the idler rollers 106 and is manually wound about the empty shell. The caterpillar is then permitted to engage the empty shell by lowering the lever 104, thereby pivoting the lugs 99 out of engagement with the arm 63. The end of a strip of gum of the new roll is then joined to the end of the last gum strip of the previously exhausted roll, after which the operation of the device may again be resumed. For sake of convenience the small motor 118, which drives the revolvable rolls, is energized by operating an individual switch 122, although its direction of rotation is controlled by the mechanism 56, described in connection with the clutch member 47. The rewinding elements, including the caterpillar, are driven by the chain 23 from a source of power (not shown) and the strips 72 are discharged from the machine at the same speed as that at which they are unwound from the rolls 69 and 71.

In order to vary the rate at which gum strip material is delivered from the machine, a transmission 123, such as that illustrated in Figs. 8 and 9, may be employed. The chain 23, which drives the shaft 25 of the gum strip supplying device, rotates an auxiliary shaft 124, which is journalled in a housing 125 that is secured to the angle irons 111 and 5. A bifurcated bell crank lever 126 is fulcrumed about the shaft 124. The upper arm of the bell crank serves as a handle and is provided with a recessed portion 127. The other arm of the bell crank rotatably supports an idler gear 128, which meshes with a similar gear 129 that is slidably keyed to the shaft 124 and is contained within the bifurcated portion of the bell crank 126. The idler 128 may be pivotally moved into engagement with any one of four gears 131, 132, 133 and 134, which are keyed to the principal shaft 25, each of these rollers being provided with a different number of teeth. Four set screws or pins 135, 136, 137 and 138 are provided which are disposed in aligned relation with respect to the four gears, and are contained in a tapped bar that is integral with the housing 125. These pins are adapted to selectively engage the recessed portion of the bell crank 126 and thereby insure proper lateral adjustment thereof.

It will be observed that the gear ratio between the driving mechanism, from which the chain 123 extends, and the gum strip removing device may be varied by merely pivoting the bell crank in the direction indicated by the arrow shown in Fig. 8 until the idler gear 128 will no longer engage one of the gears 131, 132, 133 or 134, keyed to the shaft 25. At the same time, the arm of the bell crank escapes engagement with the pins, after which the bell crank unit may be shifted along the shaft 124 until it is alinged with the gear having the desired number of teeth. In other respects the operation of the device is identical with an embodiment not including a transmission mechanism.

Although I have illustrated but the preferred forms which my invention may assume, and have described in detail the application of these forms, it will be apparent to those skilled in the art that the invention is not so limited but that various modifications and changes may be made therein without departing from the spirit of the invention or from the scope of the appended claims.

What I claim is:

1. A method of removing strips of rubber tissue from a lined roll thereof that comprises repeatedly unwinding and rewinding the lined roll on the same axis and removing a predetermined number of strips during both the unwinding and rewinding operations.

2. A method of removing strips of rubber tissue from a liner roll that comprises unwinding the liner roll and disengaging the rubber tissue during the unwinding operation by subjecting the disengaged tissue adjacent the liner to repeated sharp blows.

3. A method of freeing strips of unvulcanized rubber material from an adhering liner material that comprises subjecting one of the materials to a beating action.

4. A machine for removing gum strips from a liner roll having a plurality of gum strips wound therein comprising means for rewinding the liner roll, means for exerting a beating action against the gum strip adjacent the liner to remove the strip therefrom and means for receiving the disengaged strip.

5. A machine for disengaging gum strips from a liner roll having a plurality of gum strips wound therein and adhering thereto comprising means for receiving a disengaged strip, means for unwinding the liner roll and means for peeling a strip from the liner consisting of rapidly revolving members for exerting a beating action against one of the adhering materials.

6. A device for disengaging gum strip material from liner material comprising supports for transporting the materials, means mounted in conjunction with the supports for exerting a beating action against one of the materials in a direction away from the other material.

7. A device for disengaging gum strip material from liner material comprising means for directing the material in different directions, and driven rapidly revolving members adapted to contact with the disengaged portion of the gum strip adjacent the liner.

8. A machine for separating gum strips from a liner roll having a plurality of strips wound therein comprising means for disengaging the strips from the liner, means for receiving the disengaged strips, and means for unwinding and rewinding the liner roll including a set of rotatable shells about which the liner is wound.

9. A machine for separating gum strips from a liner roll having a plurality of strips wound therein comprising means for disengaging the strips from the liner, means for conveying the disengaged strips away from the roll, and means for unwinding and rewinding the liner roll including a set of rotatably mounted shells between which the liner and gum strips adhering thereto are conveyed, and a driven means adapted to rotate either of the shells.

10. A machine for separating gum strips from a roll of liner having a plurality of strips adhering thereto comprising means for disengaging the strips from the liner, means for conveying the disengaged strips away from the roll, and means for concurrently unwinding and rewinding the liner roll including a set of rotatably mounted shells between which the liner and gum strips are conveyed and a driven member adapted to engage and wind the liner about either of the shells.

11. A machine for separating gum strips from a roll of liner having a plurality of strips adhering thereto comprising means for disengaging the strips from the liner, means for conveying the disengaged strips away from the roll and means for concurrently unwinding and rewinding the liner roll including a set of rotatably mounted shells about which the liner is wound, a caterpillar member pivotally supported between the shells for engaging and winding the liner about either of the shells at a uniform linear speed and an eccentric mechanism for pivotally moving the caterpillar from one shell to the other and for maintaining the caterpillar in engagement with either shell.

12. A machine for separating gum strips from a roll of liner having a plurality of strips adhering thereto comprising means for disengaging the strips from the liner, means for receiving the disengaged strips and means for unwinding and rewinding the liner roll including a set of rotatably mounted shells about which the liner is wound, a driven endless belt provided with supporting means pivoted between the shells, said belt being adapted to engage and wind the liner about either of the shells at a uniform linear speed, a manually operated eccentric arm adjacent the free end of the belt supporting means for pivotally moving the belt supporting means from one shell to the other and a weight secured to the arm adapted to maintain the belt in operative relation with the shell.

13. A machine for separating gum strips from a roll of liner having a plurality of strips adhering thereto comprising means for disengaging the strips from the liner, means for receiving the disengaged strips and means for winding the liner roll including a set of rotatably mounted shells about which the liner is wound, an elongate pivotable mechanism including a driven belt adapted to engage either shell and to wind the liner thereabout, a crank member supported in the free end of the pivotable mechanism, an eccentric arm connected thereto adapted to pivot the mechanism into engagement with either of the shells and means for securing the mechanism in operative engagement with the shells.

14. A machine for removing gum strips from a roll of liner having a plurality of strips adhering thereto comprising means for disengaging the strips from the liner, means for receiving the disengaged strips and means for winding the liner roll including a set of rotatably mounted shells, a mechanism including a reversibly driven belt adapted to wind the liner about either of the shells at a uniform linear speed.

15. A machine for removing gum strips from a roll of liner having a plurality of strips adhering thereto comprising rotatably driven means for disengaging the strips from the liner, means for receiving the disengaged strips, means for winding the liner roll including a set of reversibly driven shells and means for reversing the rotatably driven means automatically with the reversibly driven shells.

16. A machine for removing gum strips from rolls of liner having a plurality of strips adhering thereto comprising means for unwinding a liner roll and means for removing one or more of the strips of gum during the unwinding operation, said unwinding means and strip removing means being relatively movable axially of the liner roll.

17. A machine for removing gum strips from rolls of liner having a plurality of strips adhering thereto comprising means including a drive shaft for concurrently unwinding and rewinding a liner roll, means for removing one or more of the gum strips during the operation of the first-mentioned means, two collars rotatably mounted upon the drive shaft, means for constantly driving the collars in opposite directions and a slidably keyed collar disposed therebetween adapted to engage and be driven by either one or the other of the collars to reverse the drive of the shaft.

18. In combination with a liner for carrying a plurality of strips of material, a pair of rolls on which said liner may be alternately wound to feed the latter in reversed directions, and means for removing a strip of material from the liner as the latter passes in either direction, said means including a device for imparting intermittent impulses to said strip.

19. In combination with a strip material carrying liner, means for removing a strip from said liner by imparting intermittent jerks to the strip material to break adhesion thereof to the liner, and means for passing said liner adjacent said strip removing means.

In witness whereof, I have hereunto signed my name.

Signed at Akron, in the county of Summit and State of Ohio, this 15th day of November, 1927.

RAPHAEL S. KIRK.